June 27, 1944.  R. C. OLESEN  2,352,219
VIBRATION MEASURING SYSTEM
Filed Oct. 7, 1941  2 Sheets-Sheet 1
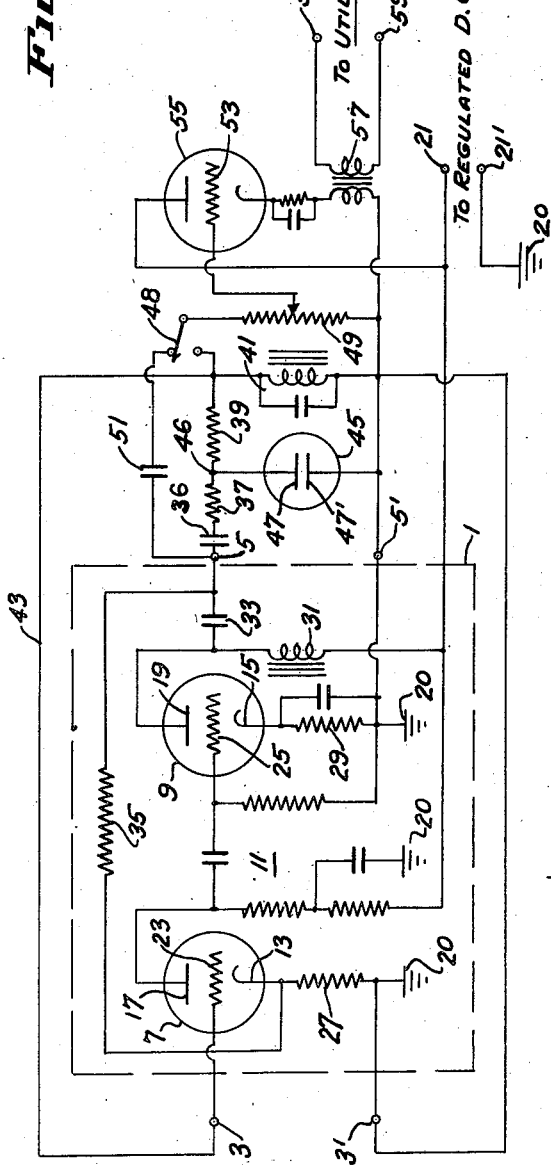
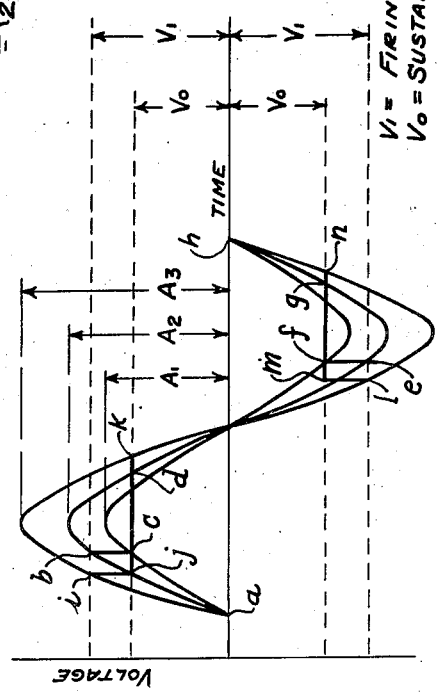
INVENTOR.
RAYMOND C. OLESEN
BY
AGENT

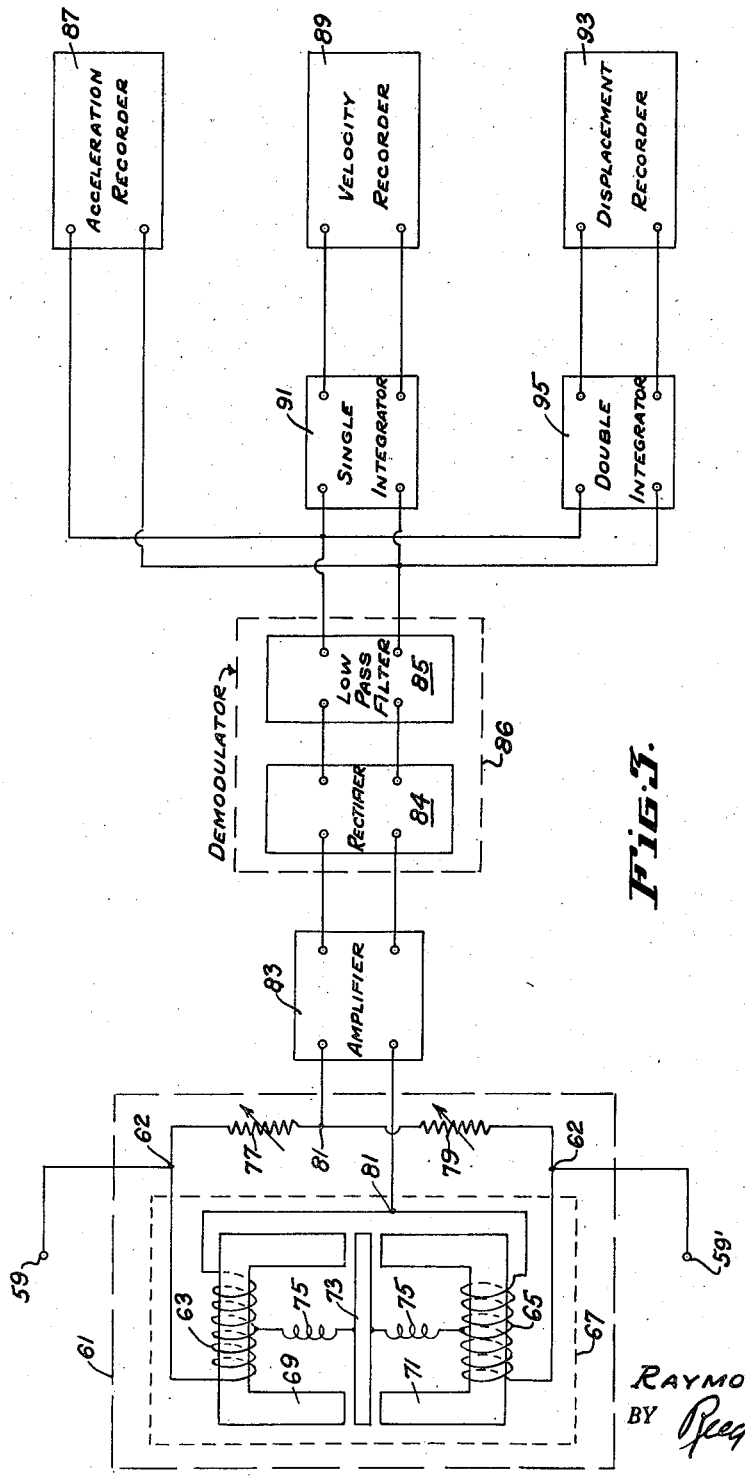

Patented June 27, 1944

2,352,219

UNITED STATES PATENT OFFICE 2,352,219

VIBRATION MEASURING SYSTEM

Raymond C. Olesen, Pasadena, Calif., assignor to Consolidated Engineering Corporation, Pasadena, Calif., a corporation of California Application October 7, 1941, Serial No. 413,937

7 Claims. (Cl. 250—36)

This invention relates to a vibration measuring system of the carrier modulation type, and in particular to a simple oscillator which generates a carrier of constant amplitude for use in such a system.

Vibrations may be measured by amplitude modulation of a carrier in accordance with the response of a vibration pickup placed at a point of a body where the vibration is to be determined and then measuring the degree of modulation of the carrier. This measurement is usually made by first demodulating the carrier to obtain the carrier envelope and then measuring changes in the carrier envelope. For this reason any variations of the amplitude of the carrier supplied from an oscillator produce the same effect on the measurements as vibrations detected by the pickup. These masking effects are particularly noticeable when the vibration pickup is responsive to a derivative of displacement and the envelope current is subsequently integrated, for under these conditions, very slow variations in the amplitude of the carrier supplied from the generator become highly magnified.

In general, the carrier oscillator or oscillation generator utilizes an amplifier having an output and an input and a regenerative connection from the output to the input. The frequency of a signal generated by such an oscillator depends on the constants of the elements in both the amplification and regenerative stages thereof. The amplitude of the generated signals is usually controlled by the overload points of the amplifier. Such amplifiers contain thermionic amplification tubes, the characteristics of which depend very largely upon the potentials applied to the electrode elements thereof. For example, the overload limit of a triode depends on the individual tube and on the potentials applied to both the plate and the grid. If for some reason a tube is changed, or if there is a variation in the potential applied to these electrodes, both the amplitude and the frequency of the generated signal may vary.

In the past frequency stability of such oscillators has been achieved by utilizing high-Q resonance control circuits, and the amplitude of the generated signals has been stabilized by close regulation of the power supply which furnishes the potentials to the elements of the amplifier vacuum tubes, or by the use of automatic volume control. Even when applying automatic volume control systems with either backward feeding or forward feeding control to maintain constant the output of an oscillation generator, sufficient control of signal amplitude is unobtainable. This may arise because of variations in the characteristics of the rectifier included in the automatic volume control circuit due to, say, variations in filament voltage or for other reasons. Such systems are inadequate for my purpose.

I am particularly concerned with the production of a constant amplitude carrier having a frequency of about 1000 cycles per second, which is to be modulated by very low frequency vibrations of about one-half cycle per second to one hundred cycles per second. To this end I reduce or limit the amplitude of signals appearing at some point in my oscillator to a definite, predetermined value, and remove by filtering harmonics of undesired frequency from the reduced signals to select therefrom components of predetermined frequencies contained therein. These selected frequencies of predetermined amplitude are then applied both to the input of the oscillator amplifier and to a load circuit in which the desired carrier modulation is to take place. In the preferred form of my invention, I produce an extremely stable carrier by utilizing a stabilized negative feedback amplifier as the oscillator amplifying element, supplying voltages to the tubes of this amplifier from a regulated power supply, and utilizing a glow, or gaseous discharge, tube in the regenerative circuit connecting the amplifier output to the amplifier input to achieve the desired reduction or limitation of the carrier amplitude.

The principal object of my invention is to maintain constant the signal output of an oscillation generator for periods of time at least as long as the period of the lowest frequency waves with which I modulate the carrier.

Another object is to prevent the masking of vibration measurements made with carrier modulation type vibration apparatus due to variations in amplitude of the carrier prior to modulation in accordance with the vibrations.

Another object is to provide an oscillator which generates signals of constant amplitude, regardless of changes in circuit constants or variations in supply potentials.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

That I have provided a simple method for controlling the amplitude of an oscillation generator with great precision and an inexpensive rugged apparatus for carrying it out will be seen from the following detailed description taken in connection with the accompanying drawings in which Fig. 1 is a circuit diagram of a preferred form of my oscillator.

Fig. 2 is a graph illustrating the operation of the preferred form of my carrier amplitude limiting device.

Fig. 3 is a schematic diagram of vibration measuring apparatus utilizing my oscillator shown in Fig. 1.

In order that my carrier modulation system for measuring vibrations may be properly understood, I will first describe my improved oscillator, which provides a carrier for my system.

Referring now to Fig. 1, illustrating my oscillator, there is shown a negative feedback stabilized amplifier 1, having an input 3, 3' and an output 5, 5'. Said amplifier comprises triode amplifying tubes 7 and 9 connected in cascade by the coupling circuit 11. Filament current from a regulated power supply (not shown) heats cathodes 13 and 15. Potentials are applied to said cathodes 13 and 15 and anodes 17 and 19 from a regulated D. C. power supply (not shown) connected across terminals 21, 21'. Grids 23 and 25 respectively of said tubes 7 and 9 are maintained at suitable negative potentials with respect to the corresponding cathodes 13 and 15 by means of current flowing through respective biasing resistors 27 and 29. Signals appearing across choke 31 in the anode circuit of triode 9 are applied to the oscillator amplifier output terminal 5 through coupling condenser 33. Terminals 3', 5', and 21' and those ends of resistors 27 and 29 not directly connected to cathodes 13 and 15 are connected to ground 20.

The amplification due to said two triodes 7 and 9 and the circuit constants of the elements connected between said input 3, 3' and said output 5, 5' may vary as a result of fluctuations in the voltage supplied from said D. C. power supply, or from fluctuations in the supply of filament voltage, and may vary appreciably when new triodes are substituted for old ones in the amplifier. In order to minimize the effects of such fluctuations and in order to reduce distortion due to non-linearity of the triodes 7 and 9, said amplifier is stabilized by means of a negative feedback connection from the output terminal 5 through feedback resistor 35 to said cathode 23 in the amplifier input. Under such circumstances the overall amplification from input to output of the negative feedback stabilized amplifier 1 is given by the formula $$A = \frac{\mu}{1 - \mu\beta}$$

where $\mu$ = amplification of amplifier 1 without feedback, and the feedback ratio is $$\beta = \frac{-R_c}{R_c + R'_{fb}}$$

$R_c$ being the resistance of cathode resistor 27, and $R'_{fb}$ being the resistance of the feedback resistor 35.

As is well known, such a negative feedback stabilized amplifier reduces distortion of waves transmitted from input to output by the ratio $$\frac{1}{1 - \mu\beta}$$

In practice $\mu\beta$ is made larger compared to unity, thus make the amplification approximately equal to $1/\beta$. This amplifier therefore, tends to be stable even when tubes thereof are changed or when fluctuations occur in the potentials supplied to the tube electrodes, or when other changes occur in the circuit elements. In such an amplifier any wave passing from input 3, 3' to output 5, 5' will be amplified by an amount approximately equal to $1/\beta$ and be substantially free from any amplifier distortion.

An auxiliary regenerative feedback circuit also connects the amplifier output 5, 5' with amplifier input 3, 3' and is so connected and arranged as to cause oscillations of predetermined frequency characteristics to appear in the loop circuit comprising the amplifier 1 and said auxiliary feedback circuit. Said auxiliary feedback circuit may comprise a condenser 36, a current limiting resistor 37, a second resistor 39, and an oscillation character control circuit in the form of a parallel resonant inductance capacitance network 41 connected in series in the order named from output terminal 5 to ground. By providing a connection 43 from the ungrounded end of the oscillation character control circuit 41 to the amplifier input terminal 3 oscillations at the natural frequency of said resonant network 41 take place as long as there is sufficient gain in said loop circuit as is well known in the art.

In order to control the amplitude of the oscillations generated, I connect an oscillation signal, or carrier, amplitude limiting device in the regenerative feedback circuit, said limiting device preferably comprising a glow discharge tube 45 connected between ground 20 and the junction point 46 intermediate resistors 37 and 39. Said glow tube is preferably of a long period stable type in which the envelope is impervious to light and electrostatically shielded, and in which the percentage difference between the firing and sustaining voltages is as small as possible, preferably less than about 10 to 15 percent. If there were no oscillations occurring in the loop circuit, both electrode elements 47 and 47' of said glow tube would be at the same potential by virtue of the fact that they are isolated from the D. C. power supply by means of said condenser 33.

Said glow discharge tube has the characteristic that when a potential applied across its electrodes through a current limiting resistor exceeds the firing, or ionization potential thereof, current immediately flows through said tube 45 and the potential across its electrodes is reduced to a characteristic sustaining voltage until such time as the voltage across the electrodes falls below said sustaining voltage, at which time the tube ceases to conduct current.

Fig. 2 is a graph representing the operation of such a glow discharge tube when a sinusoidally varying voltage is applied thereto through a current limiting resistor in series with said tube. The ordinate $V_1$ in this diagram represents the firing, or ionization, voltage, while the ordinate $V_0$ represents the sustaining voltage. If the voltage appearing across said electrodes 47, 47' has an amplitude $A_1$ which is less than the firing voltage, the glow tube 45 remains inoperative and has a resistance extremely large compared to the impedances of the electrical elements 37, 39 and 41 in the auxiliary feedback circuit. However, if the amplitude $A_2$ of the voltage applied across the glow tube exceeds the firing voltage $V_1$, the glow tube discharges and the voltage thereacross drops almost immediately to the sustaining voltage $V_0$. In such a case the voltage appearing across the glow tube and therefore across the series circuit including resistance 39 and the parallel resonant network 41, has the shape given by the curve $abcdefgh$. If the voltage applied across the glow tube 45 had still a larger amplitude $A_3$, the shape of the voltage curve would be represented by $aijklmnh$. In the above discussion $A_1$, $A_2$, and $A_3$ are the amplitudes of sinusoidal voltages which would appear across said resistance 39 and resonance circuit 41 in the absence of said glow tube 45.

In my method of producing constant amplitude oscillations, signals are amplified in an amplification stage in the form of amplifier 1, the high amplitude portions of said signals are reduced to a predetermined value in a peak limiting stage in the form of glow tube 45, components of desired frequency are selected from the reduced signals in a frequency selecting stage in the form of network 41, and the selected components are then reamplified in said amplification stage.

I have found that, as a result of the peak limiting action of the glow discharge tube, the amplitude of the component of fundamental frequency varies only an extremely small amount, even when the amplitude of the applied sinusoidal voltage A varies a large amount. Thus the glow discharge tube serves to reduce the amplitude of oscillations of fundamental frequency to a predetermined amplitude.

The resonant network 41 serves to filter out undesired harmonics from the limited signal prior to applying the feedback signal regeneratively to said input terminal 3.

Condenser 33 and resistances 35 and 27 form one high pass filter and condenser 36 and resistances 37 and 39 form a second high pass filter, said two filters being connected in cascade between the anode circuit of tube 9 and glow tube 45. Said high pass filters are designed to transmit waves of carrier frequency from the amplifier 1 to glow tube 45 while highly attenuating low frequency waves that would otherwise be applied to glow tube 45 such as by transmission thereto of low frequency voltage fluctuations from the regulated D. C. power supply through terminal 21 and choke 31 or low frequency voltage fluctuations appearing in the anode 19 circuit due to low frequency variations in electron emission from cathodes 13 and 15. By preventing low frequency voltages from reaching glow tube 45 these filters serve to eliminate any modulation of the carrier due to the non-linear characteristic of said glow tube.

When the glow tube 45 is not passing current, its resistance is very high, being of the order of several megohms. When the glow tube is discharging current, its resistance is extremely low being only a few ohms. Accordingly the value of current limiting resistance 37 in series with the glow-tube across the output is made sufficiently large compared to the low output impedance of the negative feedback stabilized amplifier 1, so that any variation in resistance of the glow-tube during the cycle of operations does not affect the amplifier gain $\mu$ to any substantial degree.

The value of resistance 39 is maintained large compared to the effective resistance $Q\omega L$ of the parallel resonant network 41, in order that the high effective Q of this resonant network may be maintained high and substantially constant throughout the cycle of operations regardless of variations in the resistance of the glow-discharge tube 45.

Thus, it is seen that by virtue of its peak limiting action, the glow-tube 45 serves to stabilize the amplitude of the generated oscillations, without affecting to any substantial degree the other electrical characteristics of the circuits.

By operation of selector switch 48, voltages of constant amplitude impressed upon the input terminals 3—3' may be applied directly to a utilization circuit through a potentiometer 49 connected across the parallel resonant network 41, or may be first amplified a constant amount $1/\beta$ by the stabilized negative feedback amplifier 1, and then applied to a utilization network through said potentiometer 49, coupled by a condenser 51, to the output terminal 5 of the amplifier. Said potentiometer also preferably has a resistance which is high compared to the effective resistance of the resonant network. If desired a portion of the signal from potentiometer 49 may be applied to the grid 53 of triode 55 and transferred to a transformer 57 in the cathode circuit of said tube 55 prior to application to a utilization circuit connected to oscillator load terminals 59, 59'.

When applied to vibration measurement the constant amplitude carrier appearing in the secondary of transformer 57 may be applied to a utilization circuit in the form of a bridge network 61 such as that shown in Fig. 3. The carrier is applied from said load terminals 59, 59' directly across diagonally opposite bridge input terminals 62, 62.

One branch of said bridge 61 comprises two arms made up respectively of variable inductances 63 and 65, said two inductances 63 and 65 comprising the moving mass of a variable reluctance type seismometer or vibration pickup, 67. Such seismometers are well known in the art and are illustrated only schematically here. Said inductances 63 and 65 may be wound respectively on two similar U-shaped cores 69 and 71 of laminated soft iron. Said cores are positioned with their pole tips opposed to each other so as to form two separate equal air gaps. A laminated soft iron armature 73 resiliently suspended between the air gaps by similar springs 75, 75 from said moving mass comprises the stationary mass, or seismic element as it is sometimes called. Said armature 73 is constrained to move in a direction perpendicular to the axes of the air gaps, so that the total air gap in the reluctance path formed by core 69 and armature 73 decreases while the air gap in the reluctance path formed by core 71 and armature 73 increases in response to vibrations applied to the moving mass.

When the natural vibration frequency of the pickup 67 is higher than the frequency of the vibrations to be measured, the changes in the values of said two inductances 63 and 65 from their normal values vary in proportion to vibration acceleration, or the second time derivative of displacement. A seismometer responding to acceleration is known as an accelerometer. Vibration pickups responsive to other time derivatives of displacement are also known in the art and need not be described here, though my invention is also applicable to such pickups.

The other branch of the bridge may comprise two series connected balance control impedances 77 and 79 which may be adjusted to set the amplitude of the carrier appearing across the diagonally opposite bridge output terminals 81, 81. Other bridge circuits to which my invention may be applied and utilizing another type of pickup having two variable impedance elements as bridge arms, are described in Patent No. 2,210,970, issued to R. K. Bonell, for "Displacement and acceleration measuring apparatus."

In operation, the amount of unbalance of bridge

61 varies in response to vibration applied to said pickup 67, resulting in a modulation of the carrier appearing across diagonally opposite output terminals 81, 81. The modulated carrier is then amplified in amplifier 83 and successively passed through a rectifier 84 and low pass filter 85 comprising demodulator 86. Said low pass filter 85 serves to filter out waves of carrier frequency. In the absence of vibration, current at a corresponding base level will flow in the output of said demodulator. If the degree of carrier modulation is less than 100%, changes in demodulator output will represent the modulation component or carrier envelope, the instantaneous amplitude of said changes being proportional to the instantaneous values of the vibratory acceleration of the moving mass of said seismometer 67. The envelope current or modulation component appearing in the output of said demodulator 86 may be applied directly to the recorder 87, in order to make a record of the acceleration, and may be applied to the recorder 89 through the single integrator 91, in order to obtain a record of the vibration velocity, and may be applied to the recorder 93, through the double integrator 95, in order to obtain a record of the vibration displacement. If desired, said recorders 87, 91 and 93 may be replaced by other types of vibration indicators.

A single integrator is shown in Patent No. 2,251,436 issued to George P. Bentley et al. for "Vibration measuring and recording apparatus." A double integrator comprises two single integrators operating in cascade with or without intermediate amplification.

Changes in the voltage output of the demodulator 86 from the base level is related to the acceleration A, the velocity V, and the displacement D, of the vibratory motion under investigation by the following well known equations, $$E = KA \quad (1)$$
$$E = j\omega VK \quad (2)$$
$$E = -\omega^2 DK \quad (3)$$

where K is a proportionality constant and $j = \sqrt{-1}$. From Equation 2, it is clear that if the bridge is adjusted to provide 100% modulation for a given vibration velocity at a frequency of 50 cycles per second, then the corresponding degree of modulation that will be obtained for the same amplitude of vibration velocity at one cycle per second will be only two percent. From Equation 3, it will be evident that if the carrier bridge is unbalanced to such an extent as to produce 100% carrier modulation for a given vibration displacement at 50 cycles, then the amount of modulation that would be produced by a one cycle per second vibration component having the same displacement amplitude would be only 0.04 of one percent. In such a case if at least a one percent accuracy is to be maintained in the measurement of a given displacement amplitude over a frequency range from one to 50 cycles per sec., the amplitude of the applied unmodulated carrier must not be permitted to vary at a rate of one cycle per second over a range of more than four parts in one million. Even closer carrier amplitude regulation is required for still a wider frequency range as from one-half cycle per second to 100 cycles per second.

It is thus evident that if accurate velocity measurements and accurate displacement measurements are to be made over a fifty- or two hundred-fold frequency range in a carrier modulation system such as that shown in Fig. 3, the amplitude of the carrier must be maintained constant within extremely close limits in order that variation in the amplitude of the carrier supplied from the oscillator will not mask measurements of the velocity or displacement of vibrations at low frequencies compared to the highest frequencies at which measurements are to be made. These requirements are met in the oscillator which I have provided.

From the foregoing discussion, it is clear that I have provided a relatively simple solution to the problem of generating oscillations of constant frequency and constant amplitude, for use in a vibration measuring system of the carrier modulation type.

I claim:

1. In an oscillator, an amplifier having an input and an output, a tuned circuit and two impedances connected in series across said output, a signal amplitude limiting tube connected in parallel with one of said impedances and said tuned circuit, and means for applying signals appearing in the tuned circuit to the amplifier input.

2. In an oscillator, a voltage amplifier having an input and an output, an impedance and a voltage peak limiting tube connected in series across said output, an impedance and a frequency selective circuit connected in series with each other and directly across said tube, and means for applying signals selected by said frequency selective circuit to the amplifier input.

3. In an oscillator, an amplifier having an input and an output, a signal limiter, a first impedance large compared to the amplifier output resistance and connecting the limiter and the amplifier output in series to render the amplification substantially independent of limiter characteristic, a tuned circuit connected to the amplifier input, and a second impedance large compared to the effective resistance of the tuned circuit and connecting the limiter and the tuned circuit in series to render the Q of the tuned circuit substantially independent of limiter characteristic.

4. In an oscillator, an amplifier having an input and an output, and a regenerative circuit connecting the input and output, said regenerative circuit including a voltage limiter whose terminal voltage is substantially independent of the current through it over a substantial current range, a first circuit for applying output signals to said voltage limiter, a second circuit including a high impedance and an oscillation frequency selective circuit connected in series with each other and directly across said limiter, and means for impressing a signal from said oscillation frequency circuit on the amplifier input.

5. Apparatus according to claim 2 having a current limiting impedance connected between the amplifier output and the limiter.

6. In an oscillator for generating oscillations of selected frequency, an amplifier having an input and an output tube with an anode and a cathode, and an output circuit connected thereto including a first impedance and a peak limiting tube connected in series, means for applying a positive direct current voltage that may fluctuate at low frequency to said anode with respect to said cathode, a reactive element included in the first impedance for reducing the magnitude of such low frequency fluctuations that may otherwise reach said limiting tube without substantially reducing the amount of signal of oscillation frequency applied thereto, a second impedance and an oscillation frequency control circuit connected in series with each other and across said peak limiting tube, and means for applying signals appearing in said control circuit to the amplifier input.

7. In an oscillator, an amplifier having an input and an output tube having an anode and a cathode, an external circuit connected between the anode and the cathode and including frequency selective means and two impedances connected in series, a signal amplitude limiting tube connected in parallel with one of said impedances and said frequency selective means, means for applying signals appearing in the frequency selective means to the amplifier input, means for shunt feeding a positive voltage to the anode with respect to the cathode at a point between said anode and the external circuit, and a blocking condenser in said external circuit connected in series with the other impedance between said tube and said point.

RAYMOND C. OLESEN.